Aug. 19, 1952     J. V. FLANAGAN     2,607,751
ACRYLONITRILE POLYMER DISSOLVED IN A DICARBOXYLIC ACID ANHYDRIDE
Filed March 2, 1948
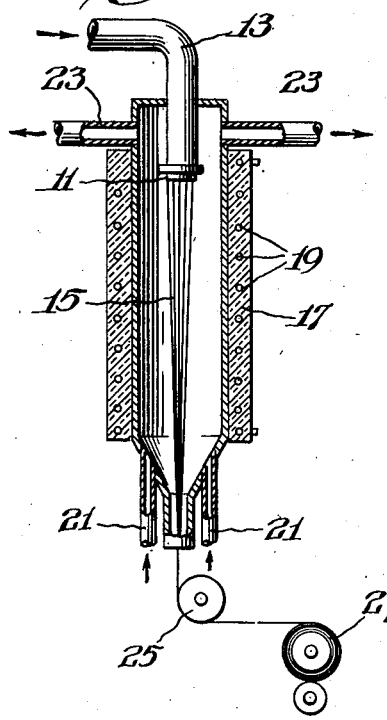
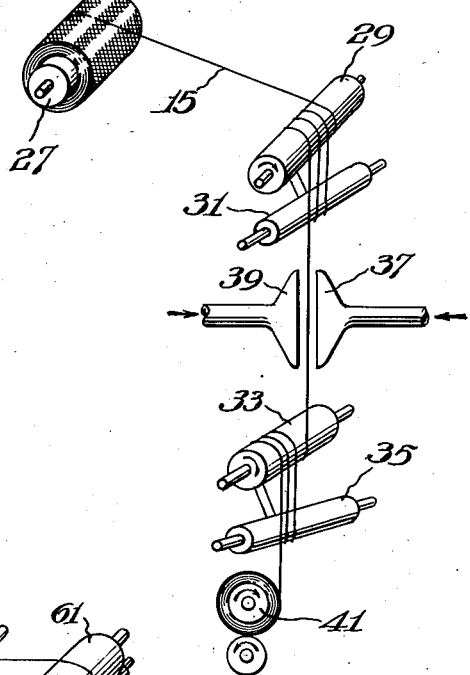
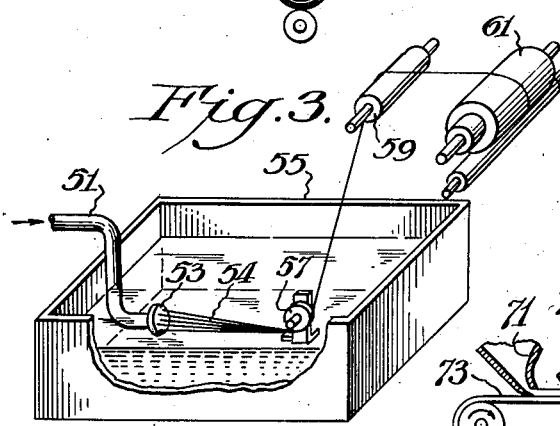
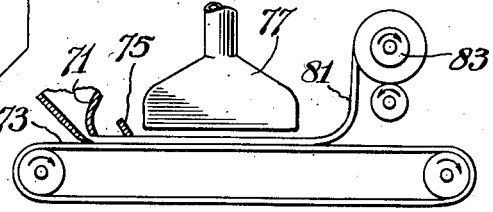
INVENTOR.
John Vernon Flanagan
BY
C. H. Mortenson
ATTORNEY Patented Aug. 19, 1952

2,607,751

UNITED STATES PATENT OFFICE 2,607,751

ACRYLONITRILE POLYMER DISSOLVED IN A DICARBOXYLIC ACID ANHYDRIDE

John Vernon Flanagan, Kenmore, N. Y., assignor to E. I. du Pont de Nemours & Company, Wilmington, Del., a corporation of Delaware Application March 2, 1948, Serial No. 12,517

17 Claims. (Cl. 260—30.4)

1

This invention relates to new compositions of matter and shaped articles produced therefrom. More particularly, this invention relates to organic solvent solutions of polyacrylonitrile, i. e. polymerized acrylonitrile $(CH_2=CHCN)_x$, and copolymers and interpolymers of acrylonitrile in which at least 85% by weight of the polymer is acrylonitrile, and to the production of shaped articles from said organic solvent solutions of said polymers of acrylonitrile.

Polyacrylonitrile and copolymers and interpolymers of acrylonitrile with other polymerizable substances, for example vinyl or acrylic compounds, in which at least 85% by weight of the polymer is acrylonitrile have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts numerous attempts have been made to form these polymeric materials into yarns, films and other shaped articles. While a number of solvents have been developed for acrylonitrile polymers, additional solvents are desired to adapt the polymers to a wide variety of uses. The present invention represents a successful dissolution of these acrylonitrile polymers in a solvent to produce a solution which is suitable for the production of commercially useful textile yarns or wrapping tissue films and similar tough, flexible structures.

It has been known heretofore that concentrated aqueous solutions of inorganic salts such as lithium bromide, zinc chloride, and sodium sulfocyanide will dissolve polyacrylonitrile and it has been proposed (Rein U. S. Patent No. 2,140,921) to employ the resulting solutions in the formation of yarns and films. However, it has been found substantially impossible to use the resulting compositions in such a manner. Their extrusion into coagulating baths of the type proposed (including such non-solvents for acrylonitrile as water, dilute acid, dilute salt solutions, etc.) results in the formation of shaped articles that contain large amounts of the inorganic salt of the proposed solvent. These salts are distributed throughout the structure and destroy the continuity of the polyacrylonitrile phase and the structure possesses poor physical properties. Removal of these salts, when possible, results in the formation of a porous, spongy, weak, undesirable structure that is very brittle and completely unsuited for use as a yarn or

2 film. Moreover, when it is attempted to form a multi-filament yarn by extruding, for example the proposed aqueous sodium sulfocyanide polyacrylonitrile composition, into a dilute acid bath, it is found that the individual filaments obtained stick together to form an essentially monofilament structure that is extremely brittle and cannot be bent or worked without breaking.

U. S. Patent No. 2,167,537 to Tobis points out that certain copolymers of acrylonitrile and an acrylic acid ester (those copolymers containing not more than 65% of acrylonitrile) are soluble in mixtures of organic solvents, such as dioxan, monochlorbenzene, cyclohexanone, etc. However, these liquids are incapable of dissolving or even swelling polyacrylonitrile or copolymers of acrylonitrile containing higher percentages of acrylonitrile, i. e. acrylonitrile polymers of the type with which this invention is concerned. As previously mentioned, polymers containing such high percentages (at least 85% by weight) of acrylonitrile are especially desirable for use because of their good physical properties and excellent chemical resistance.

It has also been proposed (Rein U. S. Patent No. 2,117,210) to dissolve polyacrylonitrile in molten quaternary ammonium salts such as benzyl pyridinium chloride, an ionizable salt. Although the resulting solution can allegedly be used to form yarns or films of polyacrylonitrile, the solution itself is dark red to brown in color, indicating that some decomposition of the polyacrylonitrile or some reaction between the polyacrylonitrile and the molten salt has probably taken place. Such solutions are not satisfactory for the production of commercially useful, shaped articles of polyacrylonitrile. Here again, it has been found practically impossible to obtain filamentary structures, such as yarns, from the compositions. Films or filaments, when obtainable, are extremely brittle; they are highly colored and very weak, presumably because of the presence within them of residual quaternary ammonium salt. Removal of this salt is difficult and the resulting structures contain numerous and large voids that make the structures substantially useless for commercial purposes.

It is therefore an object of this invention to dissolve polyacrylonitrile, or a copolymer or interpolymer of acrylonitrile in which at least 85% by weight of the polymer is acrylonitrile, in a solvent which does not react with or decompose the polymer and which may be substantially completely removed from structures formed of such a solution.

It is another object of this invention to produce a solution of polyacrylonitrile, or a copolymer or interpolymer of acrylonitrile in which at least 85% by weight of the polymer is acrylonitrile, in a solvent which does not react with or decompose the polymer, the solution being suitable for the formation of commercially useful articles, for example yarns which are suitable as textile yarns and films which are suitable as wrapping tissue.

It is a further object of this invention to produce a solution of polyacrylonitrile, or a copolymer or interpolymer of acrylonitrile in which at least 85% by weight of the polymer is acrylonitrile, in a volatile organic solvent, which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce useful shaped articles and structures of polyacrylonitrile, or copolymers or interpolymers of acrylonitrile in which at least 85% by weight of the polymer is acrylonitrile.

It is still another object of this invention to produce a shaped article or structure of polyacrylonitrile, or copolymers or interpolymers of acrylonitrile in which at least 85% by weight of the polymer is acrylonitrile, for example a yarn, film, tube, bristle or the like which is tough, flexible, tenacious and free from voids.

Other objects of the invention will appear hereinafter.

The objects of the invention may be accomplished in general by dissolving polyacrylonitrile or a copolymer or interpolymer of acrylonitrile in which at least 85% by weight of the polymer is acrylonitrile, in an organic anhydride of the type described below. If the solvent has a relatively low boiling point (less than about 250° C.), the solution of the acrylonitrile polymer may then be formed into a shaped structure, for example a yarn or film, and the solvent removed from the shaped structure, as, for example, by dry spinning. When the solvent is relatively non-volatile and has a boiling point of about 300° C. or more, shaped articles may be made from the solution by wet spinning or casting and at least a portion of the solvent may be retained therein as a plasticizer for the articles. While the amount retained may be very low, it is preferred to use conditions that leave at least 10% amounts of anhydride in the shaped article. The upper limit may be 50% or greater, by weight based on the total composition plasticized, but generally amounts less than 50% are used. For solutions, the amounts of the anhydride may be considerably higher, as, for example, 90–99%.

It has been recognized in recent years that under certain conditions, an atom of hydrogen is attracted by rather strong forces to two different atoms, instead of only one, so that it may be considered to be acting as a bond between them. This is called the hydrogen bond.

The difficulty of dissolving polymers containing at least 85% by weight of acrylonitrile is due to the presence within the polymer molecules of strong hydrogen-bonding forces, and in order to dissolve these polymers, it is necessary to find a material which will undergo hydrogen-bonding with the active hydrogen-bonding groups of the polymer molecules and thus weaken the strong hydrogen bond within the polymer molecule and cause the hydrogen-bonding forces to be shared between molecules of the polymer and the solvent. In this manner, it is possible to form a molecular dispersion of the polymer within the solvent and thus form a solution.

However, the strength of the hydrogen-bonding capacity cannot be taken as the sole criterion as to whether or not a compound will function to dissolve an acrylonitrile polymer. It is necessary also that, in order to function as a solvent for an acrylonitrile polymer, the compound contain certain groups which will be capable of satisfactorily sharing a hydrogen-bonding force with the particular active group of the acrylonitrile polymer. In most instances, these groups require the presence of a hydrogen atom on a carbon atom to which the group is attached (designated as an alpha-hydrogen atom). Such groups as require the alpha-hydrogen atom are generally ineffective to impart solvent power if the alpha-hydrogen atom is missing.

It has now been found that groups capable of conferring solvent power include the anhydride grouping:

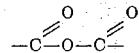

provided that the anhydride molecule is cyclic and contains at least two hydrogen atoms in the alpha position. Thus, the required groups may be

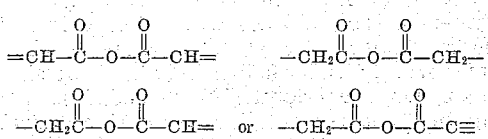

Thus, the alpha-hydrogen atoms required may be both on the same carbon atom, as in itaconic anhydride, or they may be on different alpha carbon atoms as in maleic anhydride.

It has furthermore been found that compounds containing the above-mentioned solvogenic group will be solvents for the above-mentioned polymers only if the carbon content of the compound be within certain limits, the limits for the compounds of the present invention being given below.

Thus, the objects of this invention may be accomplished in general by dissolving polyacrylonitrile or a copolymer or interpolymer of acrylonitrile in which at least 85% by weight of the polymer is acrylonitrile in a cyclic non-halogenated aliphatic organic acid anhydride containing not more than five carbon atoms corresponding to the formula:

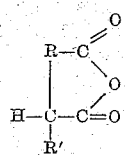

in which R is a divalent or trivalent radical containing not more than two carbon atoms and not more than one ring former selected from O, S or =NCH₃ and R', when R is divalent, designates H, or CH₃, and when R is trivalent, R' has no value.

The following table illustrates representative anhydrides within the scope of the above formula and suitable as solvents for the above mentioned acrylonitrile polymers. The value of the R and R' groups as explained above is given.

| Anhydride | Formula | R | R' |
|---|---|---|---|
| Maleic | CH—C=O<br>‖  \O<br>CH—C=O | —CH= | |
| Succinic | CH₂—C=O<br>\|   \O<br>CH₂—C=O | —CH₂— | H— |
| Methyl Succinic | CH₂—C=O<br>\|   \O<br>HC—C=O<br>\|<br>CH₃ | —CH₂— | CH₃— |
| Glutaric | CH₂—C=O<br>/   \O<br>CH₂<br>\   /<br>CH₂—C=O | —CH₂CH₂— | H— |
| Itaconic | CH₂=C—C=O<br>\|      \O<br>CH₂—C=O | CH₂=C—<br>\| | H |
| Glutaconic | CH—C=O<br>‖    \O<br>CH<br>\   /<br>CH₂—C=O | —CH=CH— | H— |
| Diglycolic | CH₂—C=O<br>/      \O<br>O<br>\      /<br>CH₂—C=O | —OCH₂— | H— |
| Di-thioglycolic | CH₂—C=O<br>/      \O<br>S<br>\      /<br>CH₂—C=O | —SCH₂— | H— |
| Acetonedicarboxylic | CH₂—C=O<br>/      \O<br>O=C<br>\      /<br>CH₂—C=O | O<br>‖<br>—C—CH₂— | H— |
| Dimethylsulfoxide Dicarboxylic | CH₂—C=O<br>/      \O<br>O=S<br>\      /<br>CH₂—C=O | O<br>‖<br>—S—CH₂— | H— |
| Dimethylsulfone Dicarboxylic | O   CH₂—C=O<br>\\ /      \O<br>S<br>// \      /<br>O   CH₂—C=O | O<br>‖<br>—S—CH₂—<br>‖<br>O | H— |
| N-Methyliminodiacetic | CH₂—C=O<br>/      \O<br>CH₃—N<br>\      /<br>CH₂—C=O | CH₃—<br>—NCH₂— | H— |
| Cyclopropanedicarboxylic | CH—C=O<br>/      \O<br>CH₂<br>\      /<br>CH—C=O | CH₂—CH—<br>\|      \| | |

While the anhydrides operable in this invention contain not more than five carbon atoms, effective solvents are found in anhydrides substituted with —CN and —SCN radicals, the total number of such radicals being no more than one. The solvent power of the compound for acrylonitrile polymers is generally increased if more than one of the solvogenic groups is present in the molecular structure of the compound, the effect of these groups being additive. For example, cyanosuccinic, cyanomethylsuccinic, and 3-methyl-4-thiocyanosuccinic anhydrides are solvents for the polymers of this invention. Similarly other solvogenic groups such as those described in the above mentioned patents can be incorporated in the anhydrides of this invention to produce effective solvents. Again it is preferred to incorporate only one additional group.

Thus, effective anhydrides can contain more than five carbon atoms providing the additional carbon atoms are contained in such solvogenic groups as nitrile and thiocyanate.

The specificity of solvent action conferred by the solvogenic groups lies at least partially in the balance of forces which the solvent molecules exert upon each other compared with that which they exert on the hydrogen bond groupings of the polymeric molecule. In explanation, the atoms of formamide are strongly associated through hydrogen bonding as is evidenced by an abnormally high boiling point. The atoms of formamide are so firmly bonded with each other that they do not attract themselves strongly to the nitrile groups of acrylonitrile polymer and so have no solvent power for the polymer. If the hydrogen bonding capacity of formamide is decreased by substituting methyl groups for the amide hydrogens, it becomes a solvent for polyacrylonitrile. On the other hand, if the carbon content of the molecule becomes too large, for example if ethyl groups are substituted for the N-methyl groups of dimethyl formamide, it becomes a non-solvent for the acrylonitrile polymers. Similar characteristics attain for the anhydrides of this invention. The anhydride must be cyclic, contain no more than five carbon atoms and have at least two alpha-hydrogen atoms. Illustrative of anhydrides which do not come within the above definitions and which are not solvents may be mentioned chloromaleic, 2,2-dimethylsuccinic, 2,3-dimethylsuccinic, citraconic, acetic, propionic, adipic, phthalic and methyl glutaric anhydrides.

All of the solvents are miscible in a wide range of proportions with polyacrylonitrile and copolymers and interpolymers of acrylonitrile. The solvents are stable at the elevated temperatures employed and they do not appear to react with or decompose the polymers. Many of the compounds are also miscible with (soluble in) such non-solvent liquids for the polymeric materials as water, aqueous salt solutions, alcohol, glycerol, etc. Solutions of an acrylonitrile polymer in many of the compounds of this invention can therefore be extruded into such liquids to form shaped articles such as yarns, films, etc. of the polymer, with the solvent being removed by selective solution in the liquid coagulant. Moreover, because many of the compounds of the invention (maleic anhydride) are volatile (vaporizable without decomposition at atmospheric pressure and at temperatures not exceeding 250° C.), solutions of the polymer in such compounds are eminently suited for use in a dry spinning or casting process for the preparation of a yarn or film of the polymer.

For the purpose of definition, a solvent is a material which, when in the liquid state, is capable of forming solutions in which the polymer is present in a concentration of 5% or more. In most instances, the solvent and polymer are miscible in almost all proportions although the miscibility may take place at elevated temperatures in the case of certain compounds.

The solutions of the invention are preferably prepared by heating the polymer or copolymer or interpolymer with one or more of the compounds of this invention (anhydrides of the type mentioned above). Some of these compounds exist in the solid state at room temperature and dissolve or retain the polymer in clear solution only at elevated temperatures, for example at temperatures of 100° C. or higher, below which temperature the composition takes on the appearance of a gel. Even in such a case however, there is usually no substantial evidence of immediate separation of the gel into two phases although after standing (i. e. sometimes after a period of several weeks), the gels may undergo syneresis. This phenomenon of gel formation of syneresis is reversible however and subsequent heating of the gelled of syneresed mass causes it to revert to solution form.

In view of the relatively high melting points of some of the solvents of this invention, they would have comparatively little use in the production of an acrylonitrile polymer spinning or casting solution. Such solvents are, however, excellent solvent plasticizers for acrylonitrile polymers containing at least 85% acrylonitrile since they are soluble in a wide range of proportions with said polymers. The present invention therefore contemplates solid solutions of acrylonitrile polymers which polymers contain at least 85% by weight of acrylonitrile as well as liquid solutions thereof.

Shaped articles obtained from solvent solutions of acrylonitrile polymer prepared in accordance with the invention and from which the solvent is subsequently removed are substantially free of foreign matter and voids after removal of the solvents, and the acrylonitrile polymer remains substantially undecomposed and chemically unchanged from the original acrylonitrile polymer prior to its solution.

The above-described solutions of acrylonitrile polymer may be shaped in the form of filaments, yarns, films, tubes and like structures by apparatus and processes generally known in the art, the detailed operating conditions being suitably modified.

Suitable methods and apparatus for the production of shaped articles of the polymers of this invention will be readily apparent by reference to the following detailed description when taken in connection with the accompanying illustrations, in which:

Figure 1 is a diagrammatic vertical sectional view showing a dry spinning cell suitable for use in accordance with the invention;

Figure 2 is a diagrammatic perspective view showing a yarn drawing device for use in connection with the invention;

Figure 3 is a diagrammatic perspective view showing a wet spinning apparatus for use in the invention; and Figure 4 is a diagrammatic side elevational view showing a suitable film casting apparatus for use in accordance with the invention.

Referring to Figure 1 of the drawing, reference numeral 11 designates a spinneret through which a plurality of filaments 15 are formed by extruding a filament-forming solution supplied to the spinneret by means of conduit 13. The spinning cell is jacketed with a material 17 such as a refractory in which is embedded an electrical heating coil 19. The spinning cell can thus be operated at any desired temperature. A plurality of conduits 21 is provided adjacent the bottom of the device for passing evaporative medium through the cell so as to remove volatile solvent from the extruded filaments 15. The evaporative medium is removed from the cell through outlet openings 23. The yarn comprising the plurality of filaments 15 is passed from the bottom of the spinning cell around guide roller 25 and is wound on a bobbin 27.

Referring to Figure 2 of the drawing, the yarn 15 is removed from the bobbin package 27 and passed about draw roller 29 and separating roller 31. From draw roller 29, the yarn is passed to a second draw roller 33 and separating roller 35. The yarn is passed around the two sets of draw rollers including their separating rollers, a sufficient number of turns to prevent slippage of the yarn. Draw roller 33 is rotated at a greater speed, for example three to ten times the speed of draw roller 29. In this manner, the yarn 15 is stretched between the two draw rollers. As the yarn passes between the two draw rollers, a heating medium is brought into contact with the yarn through blower nozzles 37 and 39. The yarn passing from the draw roller 33 is wound on bobbin 41. The drawing or stretching of the spun yarn as described is not claimed as part of the present invention, but is claimed in the copending application of Daniel T. Meloon, Serial No. 496,397, filed July 28, 1943 and now abandoned but of which the copending application Serial No. 790,821 is a continuation-in-part.

Figure 3 of the drawings illustrates a wet spinning apparatus for the production of yarn. The acrylonitrile polymer solution is passed through conduit 51 and is extruded through spinneret 53 to form a multifilament yarn 54. The yarn 54 is passed about guide roller 57 which is positioned within the coagulating liquid in tank 55. The yarn is then passed about guide roller 59 and is wound on bobbin 61.

The organic solvent solution of the acrylonitrile polymer may be cast in the form of a film as illustrated in Figure 4. In accordance with this apparatus, the polymer solution is passed from hopper 71 on to the endless steel band 73 where it is smoothed by means of a doctor knife 75. The band, together with the film, is passed under a means 77 for bringing a heated drying medium into contact with the film. The film 81 is pulled from the band 73 and collected on a mill roll 83.

The polyacrylonitrile for use with this invention is preferably prepared by the ammonium persulfate catalyzed polymerization of monomeric acrylonitrile dissolved or emulsified in water. It can however be prepared by any other suitable type of polymerization reaction such as, for example, the emulsion type reaction disclosed by U. S. Patent No. 2,160,054 to Bauer et al. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$$K_m = 1.5 \times 10^{-4}$$

$$N_{sp} = \text{specific viscosity} = \frac{\text{viscosity of solution}}{\text{viscosity of solvent}} - 1$$

and $C$ = concentration of the solution expressed as the number of moles of monomer (calculated) per liter of solution.

The molecular weight of the polymer obtained is dependent on such factors as the concentration of the monomer in the water, the amount and type of catalyst present, the temperature of the reaction, etc. For example, polyacrylonitrile having a molecular weight of approximately 60,000 can be prepared as follows: To 94 pounds of distilled water, heated to 40° C., add 40 grams of ammonium persulfate catalyst and 80 grams of sodium bisulfite activator. Then add 16 pounds of acrylonitrile slowly with stirring over a period of two hours. The polyacrylonitrile having the above-said molecular weight will precipitate from the solution. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably possessing a molecular weight of 15,000 to 250,000 or higher can be prepared in a similar manner.

The following examples in which parts, proportions and percentages are by weight unless otherwise specified, illustrate preferred methods of preparing solutions in accordance with the principles of this invention, and of employing these solutions in the manufacture of commercially satisfactory shaped articles. The invention is not to be limited by the details set forth in the examples.

*Example I*

Five parts of maleic anhydride and 0.5 parts of polyacrylonitrile having an average molecular weight of 65,000 were placed in a suitable flask which was heated rapidly to 150° to 160° C. A clear viscous solution formed readily. From this solution and similar solutions as, for example, using 27 parts of maleic anhydride and 3 parts of polyacrylonitrile, the polymer may be isolated unchanged. For example, the above solution which was prepared using 27 parts of the anhydride and 3 parts of polymer was poured into dimethylformamide and warmed until dissolved. The dimethylformamide solution was then poured slowly into two liters of a 0.1% sodium chloride solution. The precipitated polymer was filtered hot and was then washed with water until the washings no longer gave a positive test for unsaturation using potassium permanganate. A sample of the washed polymer was dried at 110° C. and was analyzed for nitrogen. It was found to contain 24.6% nitrogen which value corresponds well with the average nitrogen analysis obtained on testing a large number of control polyacrylonitrile samples. The analysis of the polyacrylonitrile sample above showed that no maleic anhydride was present in the washed polymer and that dissolving the polymer in maleic anhydride does not change the composition of the polyacrylonitrile. Likewise, the infrared spectrogram of a film cast from the above polymer sample indicated that the polyacrylonitrile had not been chemically altered by dissolution in maleic anhydride. This is true for all the anhydrides of this invention.

*Example II*

Six parts of polyacrylonitrile were dissolved in 24 parts of maleic anhydride by heating the mixture at 150° C. to 160° C. The 20% solution so formed was transferred to a spinning cell the cell temperature of which was 165° C., the spinneret temperature of which was 160° C., the spinning pressure was about 100 pounds per square inch and extrusion took place using a one hole spinneret, the diameter of the hole being 0.01 inch. The drying cell temperature was approximately 170° C. By this means a yarn was obtained which could be hot drawn, for example, 3.5 times at 125° C.

In another experiment a 20% solution of polyacrylonitrile in maleic anhydride was forced through a 1 hole spinneret (hole diameter=0.15 mm.) using a spinning head temperature of about 180° C. and a pump speed of 20 R. P. M. Samples of the resulting monofilament were collected at wind-up speeds of 6 and 10 Y. P. M. After the filament, such as that wound at 10 Y. P. M., had been washed in hot water, it was drawn 4.5 times at 130° C. This drawn monofilament had a dry tenacity of 2 grams per denier and a dry elongation of about 6.5%.

*Example III*

Forty-five parts of polyacrylonitrile and 255 parts of maleic anhydride were mixed and placed in a reservoir which was electrically heated to a temperature of 125–135° C. The resulting homogeneous slurry was pumped through an electrically heated candle filter shell at 165° C. to obtain a true solution and from which it was then forced through a candle filter and through a spinneret having 25 holes each of which had a diameter of 0.0025 inch. This spinneret was immersed in a glycerin bath. Coagulation occurred with formation of a satisfactory yarn. The glycerin bath was heated to a temperature of 160–165° C. After passing through this bath for a distance of 24 inches the yarn was wound up and was washed with water and then dried. It was free of maleic anhydride and the yarn obtained could be stretched readily at a temperature of 125° C. for example, 4½ times to give a stretched yarn having a tenacity of 2.0 grams per denier and a dry elongation of 7%. Thus, the compositions of this invention can be wet spun using glycerol baths according to the method of Watkins, U. S. Patent No. 2,426,719.

*Example IV*

A mixture of 0.22 parts of polyacrylonitrile and 2.2 parts of succinic anhydride was heated in a suitable container at 120° to 140° C. A clear colorless solution formed readily. This solution jelled upon cooling below 110° C. This and other solutions of polyacrylonitrile in succinic anhydride could be dry or wet spun according to the methods described above. Solvents yielding colorless solutions are highly desirable since articles free from objectionable color can be readily prepared therefrom.

*Example V*

Nine and one-half parts of methyl succinic anhydride and 0.5 parts of polyacrylonitrile were heated to 160° C. as in Example IV. A clear colorless solution resulted. This turned cloudy when the solution was cooled to 120° C. Filaments, yarns, etc. could be obtained from this composition by casting, dry or wet spinning according to the methods described above.

*Example VI*

Nine and one-half parts of glutaric anhydride and 0.5 parts of polyacrylonitrile were heated at 120° C. A clear solution resulted readily. Crystallizing and gelling did not occur until the composition was cooled to 30° C. and the solution did not turn cloudy during the cooling. The clear homogeneous solution obtained is suitable for wet spinning to give a yarn having substantially the same physical properties of yarns described above.

*Example VII*

Diglycolic acid anhydride (95 parts) and polyacrylonitrile (5 parts) were heated at the melting point of diglycolic anhydride, namely, 93–95° C. A clear colorless solution resulted readily. In a similar manner, a 20% solution was made but it was preferred to heat the more concentrated mixture at a higher temperature, namely 150° C., in order to effect more rapid solution. The solutions thus formed could be used in casting and extrusion processes to form filaments, foils, yarns, etc.

Example VIII

At a temperature of 160° C. 0.5 part of polyacrylonitrile was dissolved readily in 9.5 parts of itaconic anhydride. The solution was clear and colorless and turned cloudy when it cooled to 120° C. It was useful in wet or dry spinning or in casting techniques.

Example IX

Five parts of a polymer containing 95 parts of acrylonitrile and 5 parts of styrene were placed in vessel containing 95 parts of glutaric anhydride. The mixture was heated at 100° C. A clear, colorless solution formed rapidly. This solution could be used in forming shaped articles by any of the methods described above.

Example X

A polymer was prepared using 90 parts of acrylonitrile and 10 parts of methacrylic acid. This 90/10 polymer dissolved readily in diglycolic anhydride. For example, three parts of the polymer and 27 parts of the anyhdride were heated at 120° C. The solution formed was colorless and clear. Shaped articles, such as films and fibers could be prepared from these solutions by dry spinning and wet spinning techniques.

Examples XI

Maleic anhydride (225 parts) was mixed with 45 parts of a 95/5 acrylonitrile/vinyl pyridine polymer. The mixture was heated with stirring at 150–160° C. The solution resulting was clear and was not discolored. It was employed successively in the usual ways to produce shaped articles.

The solution of acrylonitrile polymer dissolved in an organic solvent in accordance with this invention must be of such a concentration that its viscosity at the operating temperature is within a workable range. When it is to be employed in the spinning of yarn or the casting of film, the solution should preferably have a viscosity within the range of 15 to 750 poises; when the polymer has a molecular weight of 250,000 or more, this requires that the maximum concentration of polymer in the spinning solution be of the order of 10%. Generally, it is preferred that the spinning solution contain at least about 10% of the polymer because of the difficulty of rapidly removing large amounts of solvent from the solution in the spinning operation. Moreover, it is economically undesirable to use such large amounts of solvent for the spinning of a given amount of polymer although it is true that the solvent can be completely recovered from the spinning operation and reused. For these reasons, it is preferred to employ a polymer having an average molecular weight of between 40,000 and 150,000 since such a polymer forms a solution of the desired viscosity since such a polymer forms a solution of the desired viscosity in concentration of the order of 15% to 25% and at a desirable spinning temperature of the order of 100° C. to 150° C. Of course, it is within the scope of the invention to heat the solution to a higher temperature, even to above the normal boiling point of the solvent, for the actual spinning operation. Here again, the controlling factor with regard to the temperature of the spinning solution is the viscosity of the solution.

While it is possible to use the solvents of this invention in admixture with other known solvents, it is preferred to use the anhydrides alone or in amounts greater than 10% by weight based on the total composition. As pointed out above, plasticized compositions may contain very small amounts of the anhydride, 10% or more being preferred. For solutions, greater amounts of the anhydride are used. Thus, in some instances a 50–50 ratio of polymer to solvent is satisfactory and in others a 10–90 ratio is preferred.

The evaporative medium employed in the dry spinning of filaments and yarns or the dry casting of films in accordance with this invention may be any vapor inert to the film- or filament-forming solution, such as air, nitrogen, steam, etc., or any suitable mixture thereof. The temperature of the evaporative medium is dependent on such factors as the dimensions of the spinning cell, the composition and rate of extrusion of the spinning solution and the rate of flow of the evaporative medium. It is only necessary that these several factors be so correlated that the yarn or other shaped article leaving the spinning cell be sufficiently freed of the solvent so that it is solidified and capable of being wound into package form or otherwise collected.

As indicated in Example III above, shaped articles of acrylonitrile polymer can also be formed by extruding the spinning solution into a suitable precipitating bath comprising a liquid that is miscible with the solvent but is a chemically inert non-solvent for the acrylonitrile polymer. As examples of such a liquid may be mentioned water, glycerin, organic solvents such as alcohol, ether, etc. or aqueous solutions of salts, alkalies or acids.

The length of travel of the shaped article through the precipitating or coagulating liquid is not critical to the invention, provided only that it be sufficiently long to solidify the acrylonitrile polymer. When the precipitating bath is water, the bath travel may be as short as ½ inch, or it may be 18 or more inches in length. When the precipitating liquid is an aqueous salt solution such as 20% solution of calcium chloride, the solidification of the acrylonitrile polymer structure is generally more gradual than in the case of water so that it is necessary to use a somewhat longer bath travel than with water. If desired, suitable means, such as guide rods or rollers may be placed in the bath to tension the yarn or other shaped article during its formation.

The article of acrylonitrile polymer thus obtained can advantageously be subjected to a stretching operation of the type employed in the above examples. This stretching is preferably performed by passing the yarn between two positively driven rollers, the peripheral speeds of which are so adjusted that the article is stretched to from two to ten times its original length, preferably approximately six times its original length. This stretching of the formed article may be performed at any suitable time. However, in the case of articles formed by the wet spinning or casting technique, it is preferably performed before the article has been completely dried. The orientation of the structure thus obtained greatly improves the physical properties of the structure, including its tenacity, its resilience, etc.

This stretching of the shaped article can also be accomplished by causing the article, while passing between stretching rollers, to contact a heated stationary pin, or to pass through an inert medium such as air, water, glycerin, etc. heated to a high temperature. Obviously, the article must not be exposed to this high temperature for a period sufficiently long to decompose the polymer. In general however, the time of contact of the article with the heated medium is so short that temperatures up to 250° C. can be employed. Although it is generally preferred to heat the article to a temperature of at least 100° C. during the stretching operation, this is not essential. Desirable results can be obtained by stretching the article without the application of heat, for example by stretching at room temperature.

In addition to acting as solvents for polyacrylonitrile or copolymers or interpolymers of acrylonitrile, the anhydride compounds of this invention, when present in small amounts, can also be used as plasticizing agents for the polymer and the higher boiling compounds of the invention are especially suited for such use. At the same time, it is, of course, to be understood that non-solvent softeners, such as glycerol, etc., can also be incorporated in the solutions of this invention, these materials remaining in the subsequently formed articles to impart a softening effect. If it is desired to use such plasticizing or softening agents with polyacrylonitrile, they are preferably added in the desired amount to an already formed solution of the polymer in a lower boiling solvent, for example to a solution of the polymer in dimethyl formamide.

Although the discussion thus far has been directed mainly toward the manufacture of yarns and films of acrylonitrile polymer, the solutions provided by the invention and the evaporative and wet spinning processes described above are equally well adapted for use in the manufacture of other shaped articles of acrylonitrile polymer, such as artificial horsehair, straws, bristles, tubes, bands and ribbons. For example, the solutions may be extruded through a suitable die and into a heated atmosphere or precipitating bath to form a tubular structure, or they may be extruded in any other desired manner. Moreover, because the solvents of the invention are miscible in a wide range of proportions with acrylonitrile polymer, the powdered polymers may be treated with small amounts of the solvent to yield a substance suitable for use in the formation of molded articles. This is a particularly important result inasmuch as it has heretofore been difficult to use this material in molding operations. In this same manner, a plurality of sheets of acrylonitrile polymer may be treated with small amounts of solvents and pressed together to form laminated articles. When present in the shaped article, the solvents of this invention (particularly those of high boiling point) are excellent plasticizers. Of course, the shaped articles may also be treated with non-solvent softening agents, for example glycerol. These plasticizing and softening agents may be incorporated in the solution of this invention or they may be applied to the shaped article as an after-treatment; or they may be added to the acrylonitrile polymer by a milling operation wherein the agents and polymers are worked between rotating rollers until a mass of the desired consistency is obtained.

This invention is primarily concerned with the steps of dissolving acrylonitrile polymer in a suitable solvent to form a stable solution adapted for use in the manufacture of shaped articles of acrylonitrile polymer. It is characteristic of the invention that the solutions provided by it are stable; i. e. the solvents do not cause a decomposition or chemical alteration of the dissolved acrylonitrile polymer. At the same time, it is also characteristic that the solvents provided by the invention are also useful in the dissolving of mixtures of acrylonitrile polymer and adjuvants such as dye modifiers, linear polyamides such as nylon, derivatives of cellulose including cellulose ethers and esters, polymers of vinyl compounds such as vinyl chloride, vinyl acetate, acrylic acid, etc., which adjuvants may be incorporated in the polyacrylonitrile solution to modify the properties, both chemical and physical, of the resulting shaped articles.

Although this invention has been described with particular regard to polyacrylonitrile, i. e. polymerized vinyl cyanide, the solvents and processes of this invention are equally useful in forming clear, stable solutions of such acrylonitrile copolymers and interpolymers as were considered heretofore to be insoluble in volatile organic solvents, i. e. acrylonitrile copolymers and interpolymers containing at least 85% by weight of acrylonitrile; such solutions can be used in the same way and for the same purposes as described herein with respect to polyacrylonitrile. It is therefore considered to be within the scope of this invention to dissolve in the above-mentioned solvents copolymers and interpolymers in which acrylonitrile is copolymerized or interpolymerized with polymerizable substances such as, for example, compounds containing one or more ethylenic linkages, e. g. vinyl acetate, vinyl chloride, acrylic acid and its esters and homologues, styrene, isobutylene and butadiene, as well as other vinyl and acrylic compounds, other olefinic or diolefinic hydrocarbons, etc. and polymers of such substances. The solvents of the present invention will also be useful as new solvents for acrylonitrile polymers which have less than 85% by weight of acrylonitrile and especially those having an average molecular weight of 15,000 to 250,000 as determined by viscosity data using the Staudinger equation and intended particularly for use in the manufacture of yarns and films.

The invention also provides a class of materials that is eminently suited for use in plasticizing structures comprising the acrylonitrile polymers. The materials provided by this invention are apparently true solvents for the above-mentioned acrylonitrile polymers. They do not tend to react with or decompose the polymer, the polymeric material obtained from the solution of this invention apparently being of the same identical chemical composition as the initial polymer. Thus, the solvents and solutions of acrylonitrile polymer provided by this invention when used in relatively small amounts are capable of softening and moistening solid particles of polymers of acrylonitrile having at least 85% by weight of acrylonitrile whereby it is possible to form molded articles of acrylonitrile polymer. Such a process is especially adapted to the formation of laminated structures from films of polyacrylonitrile, or even from films of other substances.

The invention provides practical methods for preparing shaped articles of polymers of acrylonitrile having at least 85% by weight of acrylonitrile, which articles are characterized by desirable physical and chemical properties. For example, the articles are resistant to the action of water and the common organic solvents. They are not affected by prolonged contact with relatively concentrated solutions of sulfuric acid, or other mineral acid, nor are they affected by dry cleaning solvents, etc. They differ from articles of other polymerized vinyl compounds, such as polymerized vinyl chloride, in that they do not shrink greatly when heated to high temperatures. They possess a desirable high dielectric strength and are not harmed by prolonged exposure to ultra-violet light. They are also very resistant to the action of mold and bacteria growth.

Yarns, films and similar articles of acrylonitrile polymer prepared in accordance with this invention can be stretched to yield oriented structures that possess a high tenacity, a desirable elongation, and a high elastic recovery that compares favorably with that of silk. The articles are not contaminated with undesirable salts and they are substantially free of void spaces. The films, tubings and similarly shaped articles are approximately sixteen times as impervious to the transmission of moisture vapor as are films, tubings, etc. of regenerated cellulose of the same thickness. They are substantially impervious to oils and hydrocarbons including aviation gasolines.

Because of these several unique properties which may be combined here in a single substance, acrylonitrile polymer articles produced in accordance with the principles of this invention find many important uses. While yarns made from these polymers are capable of use wherever yarns have previously been used with more or less advantage, there are certain fields where the properties of the polymer especially commend them. For example, the high tenacity, flexibility and resilience of the yarns of the invention make them suitable for use in the manufacture of hosiery and other articles of clothing while the resistance to soiling and ease of cleaning (common cleaning agents may be used on them without danger) make them desirable for use in flat fabrics, and either as multifilament or monofilament yarns in the manufacture of pile fabrics including velvets, plushes, upholstery or carpeting. The yarns can be advantageously used as either the pile and/or backing of such fabrics. At the same time, their low water absorption, high resistance to mold and bacteria growth and pronounced resistance to ultra-violet light make the yarns highly suited for use in outdoor fabrics such as tents, awnings, tarpaulins, flags, sails and the like. These same factors, taken together with the low density of the yarn (specific gravity of 1.16 as compared with 1.52 for cellulose) also permit the yarns to be manufactured into clothing and other articles for use in tropical climates where light weight, flexible fabrics that resist the action of weather, direct sunlight and mold growth are required. Other uses based on these same and related properties include the manufacture of the yarns into fishing lines, fish nets, cordage especially for marine purposes, bathing suits, umbrellas and the like. It is, of course, to be understood that the yarns of the invention can be employed in these uses in the form of either continuous filaments or as staple fibers of any given length. They can be formed into novelty yarns with other fibers, both natural and synthetic in character, and because of their high resilience, the staple fibers of the invention, particularly when crimped, are highly suited for admixture with wool.

Still other uses, particularly for monofilamentary structures of the polymer, include the manufacture of rattan-like fabric for furniture, bristles and window screening wherein the light weight, low water absorption, and high resistance of the polymer to ultra-violet light, sulfur fumes and salt air are important attributes. Moreover, the high flexibility and durability of such structures enable screens made of them to be rolled up when not in use, thus permitting their incorporation as an integral part of the window structure.

As previously mentioned, the acrylonitrile polymers with which this invention is concerned are highly resistant to the action of acids and most other chemical reagents including oils, greases and the like and this fact, taken together with their high softening point and controlled shrinkage, makes yarns of the polymer highly useful in industrial applications including such uses as filter cloths, covers for rayon spinning bobbins and cakes, clothing for workers in areas where acids and other corrosive fumes are present and the like. Still another important use, dependent mainly on its resistance to acids, comprises the manufacture of the yarn or other shaped articles of the polymer including films and tubings into liners, separators or other protective parts for storage batteries, particularly of the heavy duty type.

The above uses are primarily concerned with yarns (either multifilamentary or monofilamentary in character) of the polymer. However, it will be understood that the same desirable properties (also present in other shaped articles of the polymer such as film, tubing and the like) make these other articles useful in similar applications such as the protection of objects from the effects of moisture, common organic solvents and chemical reagents and as containers or tubings for the packaging or transport of liquids including corrosive liquids, oils, greases and the like. Moreover, because of their clarity and brilliance, films of an acrylonitrile polymer prepared in accordance with this invention also find an important use in the decorative art.

The solutions prepared in accordance with the present invention are also suited for use as lacquers or coating compositions and are especially suitable for use in the coating of wire and electrical parts where the high chemical and electrical resistance of the polymer is important.

Reference, throughout the specification and claims, to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group

that is, at least 85% by weight of the reactant material converted into and forming the polymer is acrylonitrile.

Reference is made to the issued application of Ray Clyde Houtz, U. S. 2,404,713, Serial No. 491,945, filed June 23, 1943, which covers the low temperature mixing of finely divided acrylonitrile polymers in a solvent, followed by heating to dissolve the polymer. Reference is also made to the issued application of William W. Watkins, U. S. 2,426,719, Serial No. 496,376, filed July 28, 1943, which covers the wet spinning of acrylonitrile polymer yarns by extruding solutions of acrylonitrile polymers, into baths, which are preferably hot baths, composed of liquids such as glycerol and aqueous solutions of salts, with substantial tension and stretch preferably being imposed during spinning.

Since it is obvious that many changes and modifications can be made in the above described details without departing from the nature and spirit of the invention, it is to be understood that the invention is not to be limited to the details described herein except as set forth in the appended claims.

I claim:

1. A new composition of matter as defined in claim 16 in which the polymer is polyacrylonitrile.

2. A new composition of matter as defined in claim 16 in which the polymer has a molecular weight of between 15,000 and 250,000.

3. A new composition of matter as defined in claim 16 in which the polymer has a molecular weight of between 40,000 and 150,000.

4. A new composition of matter as defined in claim 16 in which the solution has a viscosity within the range 15 to 750 poises.

5. As a new composition of matter, a polymer of acryonitrile containing in the polymer molecule at least 85% by weight of acrylonitrile dissolved in maleic anhydride.

6. A new composition of matter as defined in claim 5 in which the polymer of acrylonitrile is polyacrylonitrile.

7. The composition of claim 16 in which the solution contains at least 10% of said polymer of acrylonitrile.

8. The composition of claim 5 in which the solution contains at least 10% of said polymer of acrylonitrile.

9. The composition of claim 5 in which the polymer has a molecular weight of between 15,000 and 250,000.

10. The composition of claim 5 in which the polymer of acrylonitrile is polyacrylonitrile having a molecular weight of between 15,000 and 250,000.

11. The composition of claim 5 in which the polymer has a molecular weight of between 40,000 and 150,000.

12. The composition of claim 5 in which the polymer of acrylonitrile is polyacrylonitrile having a molecular weight of between 40,000 and 150,000.

13. The composition of claim 5 in which the solution has a viscosity within the range 15 to 750 poises.

14. As a new composition of matter, a polymer of acrylonitrile, containing in the polymer molecule at least 85% by weight of acrylonitrile, dissolved in succinic anhydride.

15. As a new composition of matter, a polymer of acrylonitrile which contains in the polymer molecule at least 85% by weight of acrylonitrile in admixture with more than 10%, based on the total weight of said composition, of a non-halogenated organic anhydride containing no more than five carbon atoms and having at least two alpha-hydrogen atoms, said anhydride selected from the group consisting of maleic anhydride, cyclopropane-dicarboxylic anhydride and an anhydride embraced by the formula:

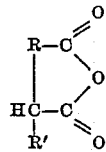

wherein R is a radical containing at least one carbon atom adjacent to the carboxyl group but not more than two carbon atoms, said

group in said formula contains not more than one ring former selected from the group —O—, —S—

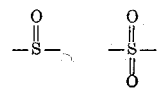

and

and R' is a substituent taken from the group hydrogen and methyl.

16. As a new composition of matter, a polymer of acrylonitrile which contains in the polymer molecule at least 85% by weight of acrylonitrile dissolved in a solvent comprising more than 10%, based on the total weight of said composition, of a non-halogenated organic anhydride containing no more than five carbon atoms and having at least two alpha-hydrogen atoms, said anhydride selected from the group consisting of maleic anhydride, cyclopropane-dicarboxylic anhydride and an anhydride embraced by the formula:

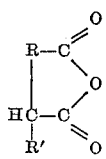

wherein R is a radical containing at least one carbon atom adjacent to the carboxyl group but not more than two carbon atoms, said

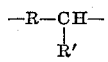

group in said formula contains not more than one ring former selected from the group —O—, —S—

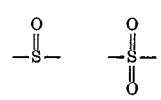

and

and R' is a substituent taken from the group hydrogen and methyl.

17. A new composition comprising a homogeneous miscible mixture of an anhydride of the group consisting of maleic anhydride and succinic anhydride, and a polymer of at least 85% of acrylonitrile said polymer having a molecular weight of at least 10,000.

JOHN VERNON FLANAGAN.

REFERENCES CITED

The following references are of record in the file of this patent:

UNITED STATES PATENTS

| Number | Name | Date |
| --- | --- | --- |
| 2,316,196 | Tucker | Apr. 13, 1943 |
| 2,346,107 | Johnson | Apr. 4, 1944 |
| 2,498,605 | Ham | Feb. 21, 1950 |